US012567906B2

(12) United States Patent
Kunjidhapatham et al.

(10) Patent No.: US 12,567,906 B2
(45) Date of Patent: Mar. 3, 2026

(54) API BASED INTER-NODE CONTROL PLANE COMMUNICATION INFRASTRUCTURE

(71) Applicant: Infinera Corp., San Jose, CA (US)

(72) Inventors: Ashok Kunjidhapatham, Devarachikkanahalli (IN); Rajan Rao, Fremont, CA (US); Snigdho Bardalai, San Ramon, CA (US); Pradeep Kumar Reddy Buyanni, San Jose, CA (US); Kapil Juneja, Karnataka (IN)

(73) Assignee: Infinera Corp., San Jose, CA (US)

( * ) Notice: Subject to any disclaimer, the term of this patent is extended or adjusted under 35 U.S.C. 154(b) by 265 days.

(21) Appl. No.: 18/461,058

(22) Filed: Sep. 5, 2023

(65) Prior Publication Data

US 2024/0080102 A1    Mar. 7, 2024

Related U.S. Application Data

(60) Provisional application No. 63/403,602, filed on Sep. 2, 2022.

(51) Int. Cl.

| | |
|---|---|
| *H04B 10/27* | (2013.01) |
| *G06F 9/54* | (2006.01) |
| *G06F 9/445* | (2018.01) |
| *H04J 14/00* | (2006.01) |
| *H04J 14/02* | (2006.01) |

(Continued)

(52) U.S. Cl.
CPC ............. *H04B 10/27* (2013.01); *G06F 9/547* (2013.01); *G06F 9/44526* (2013.01); *G06F 9/54* (2013.01); *H04J 14/00* (2013.01); *H04J 14/0201* (2013.01); *H04J 14/0227* (2013.01);

*H04J 14/0287* (2013.01); *H04L 67/10* (2013.01); *H04Q 11/00* (2013.01); *H04Q 2011/0037* (2013.01); *H04Q 11/0062* (2013.01)

(58) Field of Classification Search
CPC ..... H04B 10/27; G06F 9/547; G06F 9/44526; G06F 9/54; G06F 9/546; H04J 14/00; H04J 14/0201; H04J 14/0227; H04J 14/0287; H04J 14/0295; H04L 67/10; H04Q 11/00; H04Q 11/0062; H04Q 2011/0037
USPC ..................................................... 398/43–103
See application file for complete search history.

(56) References Cited

U.S. PATENT DOCUMENTS

| | | | | | |
|---|---|---|---|---|---|
| 6,140,920 | A | * | 10/2000 | Roberts | .............. H04B 10/0797 398/1 |
| 9,658,904 | B2 | * | 5/2017 | Siebler | .................... G06F 9/545 |

(Continued)

*Primary Examiner* — Dibson J Sanchez

(57) ABSTRACT

Disclosed herein is an optical node comprising an FRU and a controller. The FRU comprises a module processor and a module memory storing a control plane application (CPA) executable by the module processor. The controller comprises an interface, a controller processor, and a controller memory storing instructions and an application that cause the controller processor to: instantiate a first network having a first client and a first server; register a plugin associated with the CPA with the first network; register an interface having a callback function and operable to communicate with the CPA via a second network; receive, by the interface via the second network, a request having a request property from the CPA; transmit the request, via the plugin, to the first client; receive a response via the first client from a remote node; and transmit, by the interface, the response to the module processor via the second network.

20 Claims, 3 Drawing Sheets

(51) Int. Cl.
   *H04L 67/10* (2022.01)
   *H04Q 11/00* (2006.01)

(56) References Cited

U.S. PATENT DOCUMENTS

| | | | | |
|---|---|---|---|---|
| 10,476,936 B1* | 11/2019 | Retnakumari | .......... | H04L 67/06 |
| 2001/0052111 A1* | 12/2001 | Scott | .......... | G06F 8/76 |
| | | | | 717/100 |
| 2004/0076151 A1* | 4/2004 | Fant | .......... | H04J 3/085 |
| | | | | 370/395.5 |
| 2005/0030951 A1* | 2/2005 | Maciocco | .......... | H04Q 11/0066 |
| | | | | 370/395.2 |
| 2006/0002705 A1* | 1/2006 | Cline | .......... | H04L 41/34 |
| | | | | 398/33 |
| 2008/0069133 A1* | 3/2008 | Yong | .......... | H04L 47/826 |
| | | | | 370/443 |
| 2009/0041458 A1* | 2/2009 | Lin | .......... | H04L 12/2861 |
| | | | | 398/58 |
| 2009/0138892 A1* | 5/2009 | Almasi | .......... | G06F 13/387 |
| | | | | 719/313 |
| 2009/0287772 A1* | 11/2009 | Stone | .......... | G06F 9/547 |
| | | | | 709/203 |
| 2009/0304010 A1* | 12/2009 | Kurebayashi | .......... | H04L 45/03 |
| | | | | 370/401 |
| 2009/0327486 A1* | 12/2009 | Andrews | .......... | H04L 67/142 |
| | | | | 709/227 |
| 2011/0305136 A1* | 12/2011 | Pan | .......... | H04L 45/28 |
| | | | | 370/216 |
| 2014/0052771 A1* | 2/2014 | Anantharam | .......... | G06F 9/547 |
| | | | | 709/201 |
| 2014/0081901 A1* | 3/2014 | Szymczak | .......... | G06F 8/35 |
| | | | | 707/750 |
| 2014/0351397 A1* | 11/2014 | Pan | .......... | H04L 45/125 |
| | | | | 709/223 |
| 2016/0127454 A1* | 5/2016 | Maheshwari | .......... | H04L 67/10 |
| | | | | 709/223 |
| 2016/0173190 A1* | 6/2016 | Skalecki | .......... | H04B 10/03 |
| | | | | 398/1 |
| 2017/0048134 A1* | 2/2017 | Bruno | .......... | H04L 45/30 |
| 2017/0078771 A1* | 3/2017 | Lingampalli | .......... | H04Q 11/0067 |
| 2017/0286192 A1* | 10/2017 | Thomas | .......... | G06F 9/546 |
| 2017/0338887 A1* | 11/2017 | Rao | .......... | H04J 14/0293 |
| 2018/0063848 A1* | 3/2018 | Ashrafi | .......... | H04W 24/04 |
| 2018/0123945 A1* | 5/2018 | Wang | .......... | H04L 45/42 |
| 2018/0324247 A1* | 11/2018 | Hood | .......... | H04L 12/4641 |
| 2020/0036467 A1* | 1/2020 | Tse | .......... | H04B 10/25 |
| 2020/0100003 A1* | 3/2020 | Sen | .......... | H04L 45/64 |
| 2020/0351332 A1* | 11/2020 | Palladino | .......... | H04L 67/10 |
| 2020/0379781 A1* | 12/2020 | Rachapudi | .......... | G06F 8/30 |
| 2021/0004283 A1* | 1/2021 | Trocki | .......... | G06F 9/44526 |
| 2021/0091874 A1* | 3/2021 | Agarwal | .......... | H04Q 11/0062 |
| 2021/0250317 A1* | 8/2021 | Kras | .......... | H04L 69/22 |
| 2021/0385252 A1* | 12/2021 | Lebin | .......... | G06F 21/52 |
| 2021/0406039 A1* | 12/2021 | Theimer | .......... | G06F 8/36 |
| 2022/0029857 A1* | 1/2022 | Ponnuru | .......... | H04L 12/4633 |
| 2022/0147375 A1* | 5/2022 | Bovet | .......... | G06F 9/54 |
| 2024/0097821 A1* | 3/2024 | Wang | .......... | H04L 1/0076 |

* cited by examiner

API BASED INTER-NODE CONTROL PLANE COMMUNICATION INFRASTRUCTURE

CROSS-REFERENCE TO RELATED APPLICATIONS

This application claims the benefit of U.S. Provisional Patent Application No. 63/403,602, which was filed on Sep. 2, 2022, the contents of which are incorporated herein by reference in their entirety.

BACKGROUND OF THE INVENTION

Optical networking is a communication means that utilizes signals encoded in light to transmit information (e.g., data) as an optical signal in various types of telecommunications networks. Optical networking may be used in relatively short-range networking applications such as in a local area network (LAN) or in long-range networking applications spanning countries, continents, and oceans. Generally, optical networks utilize optical amplifiers, a light source such as lasers or LEDs, and wave division multiplexing to enable high-bandwidth, transcontinental communication.

Optical networks are a critical component of the global Internet backbone. This infrastructure acts as the underlay, providing the plumbing for all other communications to take place (e.g., access, metro, and long-haul). In the traditional 7-layer OSI model, Optical networks constitute the Layer 1 functions, providing digital transmission of bit streams transparently across varying distances over a chosen physical media (in this case, optical). Optical networks also encompass an entire class of devices (which are referred to as Layer 0), which purely deal with optical photonic transmission and wavelength division multiplexing (WDM). This includes amplification, (re-)generation and optical add/drop multiplexing (OADM). The most widely adopted Layer 1/Layer 0 transport networking technologies today, referred to as Optical Transport Networks (OTN), are based on ITU-T standards. Both these classes of networks are connection-oriented and circuit-switched in nature.

SUMMARY OF THE INVENTION

Typically, each optical node (source node) of an optical transport network may communicate with neighboring optical nodes (remote nodes) using a protocol through exchange of predetermined messages, which may be hardcoded, are dependent on compatible versioning, and must be updated when node configurations change. Each optical node may include a controller card and one or more field replaceable unit (FRU). As FRUs are replaced or upgraded, the FRU may offer new functionality. Traditionally, control plane communication between optical nodes may not be aware of the change in available functions and may not be able to access the changed functions.

The problem of exposing control plane application functionality may be solved by the systems and methods described herein, including registering API definitions for remote applications on remote nodes to invoke, and invoking APIs provided by the remote nodes one the remote node.

In one aspect, the present disclosure is directed to an optical node, comprising a field replaceable unit (FRU) and a node controller. The field replaceable unit comprises a module processor and a module memory comprising a non-transitory processor-readable medium storing processor-executable instructions and a control plane application that may be executed by the module processor. The node controller comprises a configuration interface, a controller processor, and a controller memory comprising a non-transitory processor-readable medium storing processor-executable instructions and a first communication application that when executed by the controller processor cause the controller processor to: instantiate a first messaging network having a first messaging client and a first messaging server; register an application plugin associated with the control plane application of the field replaceable unit with the first messaging network; register an application interface comprising at least a callback function and operable to communicate with the control plane application of the field replaceable unit via a second messaging network; receive, by the application interface via the second messaging network, a request having one or more request property from the module processor executing the control plane application; transmit the request, via the application plugin, to the first messaging client; receive a response via the first messaging client from a remote node, the response being associated with the request; and transmit, by the application interface, the response to the module processor via the second messaging network.

In another aspect, the present disclosure is directed to an optical transport network comprising a source node and a remote node. The source node comprises a first field replaceable unit and a first node controller. The first field replaceable unit comprises a first module processor and a first module memory comprising a non-transitory processor-readable medium storing processor-executable instructions and a control plane application that may be executed by the first module processor. The first node controller comprises a first controller processor and a first controller memory comprising a first non-transitory processor-readable medium storing processor-executable instructions and a first communication application that when executed by the first controller processor cause the first controller processor to: instantiate a first messaging network having a first messaging client and a first messaging server; register a first application plugin associated with the control plane application of the first field replaceable unit with the first messaging network; register a first application interface comprising at least a callback function and operable to communicate with the control plane application of the field replaceable unit via a second messaging network; receive, by the first application interface via the second messaging network, a request from the first module processor executing the control plane application; transmit the request, via the first application plugin, to the first messaging client; receive a response via the first messaging client, the response being associated with the request; and transmit, by the first application interface, the response to the first module processor via the second messaging network. The remote node comprises a second node controller comprising: a second controller processor and a second controller memory comprising a second non-transitory processor-readable medium storing processor-executable instructions and a second communication application that when executed by the second controller processor cause the second controller processor to: instantiate a third messaging network having a third messaging client and a third messaging server; receive the request from the first messaging client via the third messaging server; generate the response to the request; and transmit the response to the first messaging client via the third messaging server.

Implementations of the above techniques include methods, apparatus, systems, and computer program products. One such computer program product is suitably embodied in a non-transitory machine-readable medium that stores instructions executable by one or more processor. The instructions are configured to cause the one or more processor to perform the above-described actions.

The details of one or more implementation of the subject matter of this specification are set forth in the accompanying drawings and the description below. Other aspects, features, and advantages will become apparent from the description, the drawings, and the claims.

BRIEF DESCRIPTION OF THE DRAWINGS

The accompanying drawings, which are incorporated in and constitute a part of this specification, illustrate one or more implementation described herein and, together with the description, explain these implementations. The drawings are not intended to be drawn to scale, and certain features and certain views of the figures may be shown exaggerated, to scale, or in schematic in the interest of clarity and conciseness. Not every component may be labeled in every drawing. Like reference numerals in the figures may represent and refer to the same or similar element or function. In the drawings.

DETAILED DESCRIPTION

Figures 1, 2, 3:
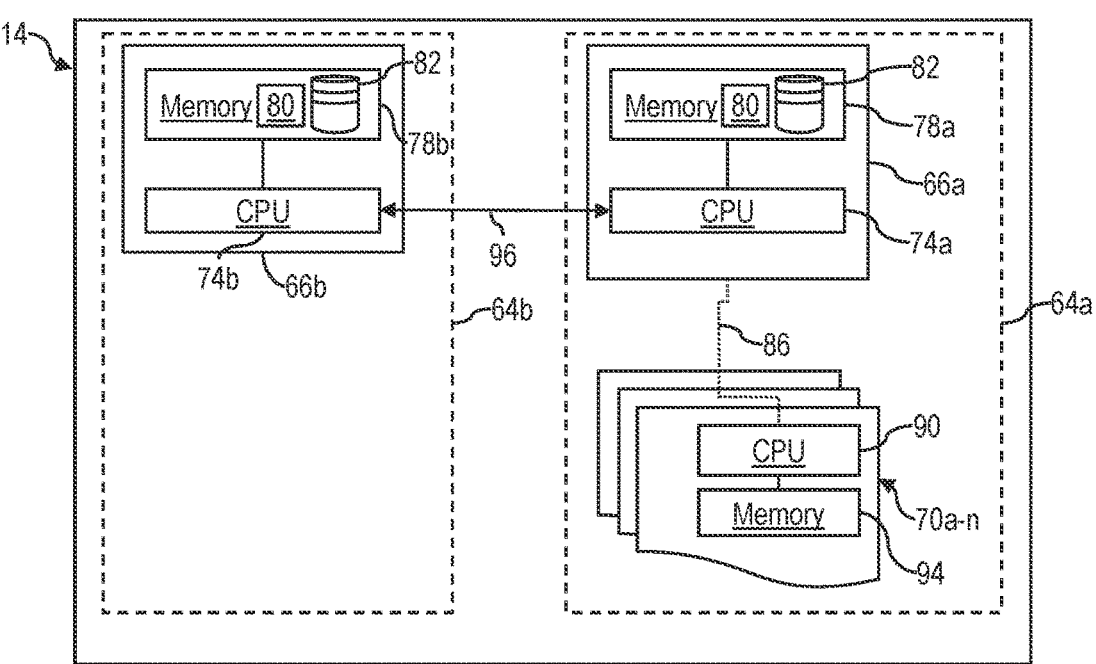
FIG. 1 is a diagrammatic view of an exemplary implementation of an optical transport network constructed in accordance with the present disclosure.
FIG. 2 is a diagrammatic view of an exemplary implementation of a computer system for use in the optical network shown in FIG. 1 constructed in accordance with the present disclosure.
FIG. 3 a diagrammatic view of an exemplary implementation of the optical node of FIG. 1 constructed in accordance with the present disclosure.

The following detailed description of example implementations refers to the accompanying drawings. The same reference numbers in different drawings may identify the same or similar elements.

As used herein, the terms "comprises," "comprising," "includes," "including," "has," "having", or any other variation thereof are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the implementations herein. This is done merely for convenience and to give a general sense of the inventive concept. This description should be read to include one or more and the singular also includes the plural unless it is obvious that it is meant otherwise.

Further, use of the term "plurality" is meant to convey "more than one" unless expressly stated to the contrary.

As used herein, qualifiers like "about," "approximately," and combinations and variations thereof, are intended to include not only the exact amount or value that they qualify, but also some slight deviations therefrom, which may be due to manufacturing tolerances, measurement error, wear and tear, stresses exerted on various parts, and combinations thereof, for example.

The use of the term "at least one" or "one or more" will be understood to include one as well as any quantity more than one. In addition, the use of the phrase "at least one of X, V, and Z" will be understood to include X alone, V alone, and Z alone, as well as any combination of X, V, and Z.

The use of ordinal number terminology (i.e., "first", "second", "third", "fourth", etc.) is solely for the purpose of differentiating between two or more items and, unless explicitly stated otherwise, is not meant to imply any sequence or order or importance to one item over another or any order of addition.

As used herein any reference to "one implementation" or "an implementation" means that a particular element, feature, structure, or characteristic described in connection with the implementation is included in at least one implementation. The appearances of the phrase "in one implementation" in various places in the specification are not necessarily all referring to the same implementation.

Circuitry, as used herein, may be analog and/or digital components, or one or more suitably programmed processor (e.g., microprocessors) and associated hardware and software, or hardwired logic. Also, "components" may perform one or more function. The term "component" may include hardware, such as a processor (e.g., microprocessor), a combination of hardware and software, and/or the like. Software may include one or more computer executable instruction that when executed by one or more component cause the component to perform a specified function. It should be understood that the algorithms described herein may be stored on one or more non-transitory memory. Exemplary non-transitory memory may include random access memory, read only memory, flash memory, and/or the like. Such non-transitory memory may be electrically based, optically based, and/or the like.

As used herein, the terms "network-based," "cloud-based," and any variations thereof are intended to include the provision of configurable computational resources on demand via interfacing with a computer and/or computer network, with software and/or data at least partially located on a computer and/or computer network.

As used herein, a "route" and/or an "optical route" may correspond to an optical path and/or an optical light path. For example, an optical route may specify a path along which light is carried between two or more network entities.

As used herein, an optical link may be an optical fiber, an optical channel, an optical super-channel, a super-channel group, an optical carrier group, a set of spectral slices, an optical control channel (e.g., sometimes referred to herein as an optical supervisory channel, or an "OSC"), an optical data channel (e.g., sometimes referred to herein as "BAND"), and/or any other optical signal transmission link.

As used herein, the C-Band is a band of light having a wavelength between 1528.6 nm and 1566.9 nm. The L-Band is a band of light having a wavelength between 1569.2 nm and 1609.6 nm. Because the wavelength of the C-Band is smaller than the wavelength of the L-Band, the wavelength of the C-Band may be described as a short, or a shorter, wavelength relative to the L-Band. Similarly, because the wavelength of the L-Band is larger than the wavelength of the C-Band, the wavelength of the L-Band may be described as a long, or a longer, wavelength relative to the C-Band. Further, the O-band is a band of light having a wavelength between 1260 nm to 1360 nm.

As used herein, a reconfigurable add-drop multiplexer (ROADM) node refers to an all-optical subsystem that enables remote configuration of wavelengths at any ROADM node. A ROADM is software-provisionable so that a network operator can choose whether a wavelength is added, dropped, or passed through the ROADM node. The technologies used within the ROADM node include wavelength blocking, planar light wave circuit (PLC), and wavelength selective switching (WSS)-though the WSS has become the dominant technology. A ROADM system is a metro/regional wavelength division multiplexing (WDM) or long-haul dense wavelength division multiplexing (DWDM) system that includes a ROADM node. ROADMs are often talked about in terms of degrees of switching, ranging from a minimum of two degrees to as many as eight degrees, and occasionally more than eight degrees. A "degree" is another term for a switching direction and is generally associated with a transmission fiber pair. A two-degree ROADM node switches in two directions, typically called East and West. A four-degree ROADM node switches in four directions, typically called North, South, East, and West. In a WSS-based ROADM network, each degree requires an additional WSS switching element. So, as the directions switched at a ROADM node increase, the ROADM node's cost increases.

Referring now to the drawings, and in particular to FIG. 1, shown therein is a diagrammatic view of an exemplary implementation of an optical transport network 10 constructed in accordance with the present disclosure. The optical transport network 10 may include a plurality of optical nodes 14a-n (hereinafter "optical node 14"). In the implementation shown, the optical transport network 10 includes four optical nodes 14a-d, including a first optical node 14a, a second optical node 14b, a third optical node 14c, and a fourth optical node 14d; however, in other implementations, the optical transport network 10 may include more or less than four optical nodes 14a-n.

In one implementation, one or more optical node 14 may be optically coupled to one or more transponder node 16. For example, as shown in FIG. 1, a first transponder node 16a and a second transponder node 16b are optically coupled to the first optical node 14a and a third transponder node 16c is optically coupled to the third optical node 14c. It should be noted that, while transponder nodes 16 are only shown as being optically coupled to the first optical node 14a and the third optical node 14c, one or more transponder nodes 16 may be coupled to any of the optical nodes 14. Each of the transponder nodes 16 may supply an optical signal to, or receive an optical signal from, an optical node 14 to which is it optically coupled. Each transponder node 16 may comprise one or more coherent optical transceiver. In one implementation, each of the transponder nodes 16 may be in communication with a communication network 30 as described below. For example, the transponder nodes 16, coupled to the communication network 30, may receive configuration information and, in some implementations, may receive out of band control plane communications.

The optical transport network 10 may include any type of network that uses light as a transmission medium. For example, the optical transport network 10 may include a fiber-optic based network, an optical transport network, a light-emitting diode network, a laser diode network, an infrared network, a wireless optical network, a wireless network, combinations thereof, and/or other types of optical networks.

Particular ones of the optical nodes 14a-n may be denoted as a terminal node for an optical signal being transmitted within the optical transport network 10. Each terminal node may either transmit or receive the optical signal being transmitted within the optical transport network 10. During peer-to-peer communication between the optical nodes 14, a particular optical node of the optical nodes 14 may be communicatively coupled to one or more others of the optical nodes 14. For example, the particular optical node may include a source node and the one or more others of the optical nodes 14 may be one or more remote node. In the implementation shown, the first optical node 14a may be the source node while one or more of the second optical node 14b, the fourth optical node 14d, the first transponder node 16a and the second transponder node 16b are each remote nodes.

Other ones of the optical nodes 14a-n between the nodes 14a, 14c may operate to pass through the optical signal without converting the optical signal into an electrical signal.

Each of the optical nodes 14a-n may be implemented in a variety of ways, non-exclusive examples of which including optical line terminals (OLTs), optical cross connects (OXCs), optical line amplifiers (OAs), optical add/drop multiplexer (OADMs) and/or reconfigurable optical add/drop multiplexers (ROADMs), interconnected by way of intermediate links. OLTs may be used at either end of a connection or intermediate link. OADM/ROADMs may be used to add, terminate and/or reroute wavelengths or fractions of wavelengths. Optical nodes are further described in U.S. Pat. No. 7,995,921 titled "Banded Semiconductor Optical Amplifiers and Waveblockers", U.S. Pat. No. 7,394,953 titled "Configurable Integrated Optical Combiners and Decombiners", and U.S. Pat. No. 8,223,803, titled "Programmable Time Division Multiplexed Switching," the entire contents of each of which are hereby incorporated herein by reference in its entirety. In one implementation, both Layer-1 (digital) and Layer-O (Optical) nodes may be considered optical nodes 14.

Each of the optical nodes 14a-n may be connected to each other by optical links 18a-n. Each of the optical links 18a-n may be a fiber optic cable (or, a fiber optic cable pair) and may be uninterrupted (i.e., having no break in the fiber optic cable) or may have one or more optical node 14a-n disposed thereon and positioned in between each of the optical nodes 14a-n. In the implementation shown, the optical transport network 10 includes four optical links 18a-d, including a first optical link 18a between the first optical node 14a and the second optical node 14b, a second optical link 18b between the second optical node 14b and the third optical node 14c, a third optical link 18c between the third optical node 14c and the fourth optical node 14c, and a fourth optical link 18d between the first optical node 14a and the fourth optical node 14d; however, in other implementations, the optical transport network 10 may include more or less than four optical links 18a-n.

An optical signal being transmitted within the optical transport network 10 from the first optical node 14a to the third optical node 14c may traverse one or more paths through the optical transport network 10. In the implementation shown, the optical transport network 10 includes a working path 22a and a protection path 22b. The working path 22a may be formed between the first optical node 14a and the third optical node 14c through the second optical node 14b and includes the first optical link 18a and the second optical link 18b as components thereof. The protection path 22b may be formed between the first optical node 14a and the third optical node 14c through the fourth optical node 14d and includes the third optical link 18c and the fourth optical link 18d as components thereof.

While the working path 22a and the protection path 22b are described as traversable by an optical signal being transmitted from the first optical node 14a to the third optical node 14c, each of the working path 22a and the protection path 22b may be bidirectional; that is, each of the working path 22a and the protection path 22b may be traversable by an optical signal being transmitted from the third optical node 14c to the first optical node 14a.

The working path 22a may be described as a default path for the optical signal to traverse; that is, the working path 22a may be a data path configured to carry data traffic while there is no failure or fault signal on the working path 22a. The protection path 22b may be described as a backup path for the optical signal to traverse if the optical signal is unable to traverse the working path 22a; that is, the protection path 22b may be a data path configured to carry data traffic while there is a failure or fault signal on the working path 22a.

If there is a failure or fault signal on the working path 22a, then the working path 22a may be said to have failed. As described further below, if the working path 22a is failed, then data traffic may be directed from the working path 22a to the protection path 22b. If the failure or fault signal is resolved, then the working path 22a may be said to have recovered from failure. The working path 22a may be revertive or non-revertive. Revertive means that data traffic is directed from the protection path 22b to the working path 22a after the working path 22a recovers from failure, while non-revertive means that data traffic is not directed from the protection path 22b to the working path 22a after the working path 22a recovers from failure.

In some implementations, a user may interact with a computer system 26 (e.g., via a user device (not shown)) that may be used to communicate with one or more of the optical nodes 14a-n and the one or more transponder nodes 16 via the communication network 30. Each element of the computer system 26 may be partially or completely network-based or cloud-based and may or may not be located in a single physical location.

As further described below, in some implementations, the computer system 26 may comprise a processor and a memory having a data store that may store data such as network element version information, firmware version information, sensor data, system data, metrics, logs, tracing, and the like in a raw format as well as transformed data that may be used for tasks such as reporting, visualization, analytics, signal routing, power loading operations and/or coordination, etc. The data store may include structured data from relational databases, semi-structured data, unstructured data, time-series data, and binary data. The data store may be a database, a remote accessible storage, or a distributed filesystem. In some implementations, the data store may be a component of an enterprise network.

In some implementations, the computer system 26 is connected to one or more of the optical nodes 14a-n via the communication network 30. In this way, the computer system 26 may communicate with the optical nodes 14a-n, and may, via the communication network 30, transmit to or receive data (such as operations, parameters, configurations and the like) from the optical nodes 14a-n. In other implementations, the computer system 26 may be integrated into each of the optical nodes 14a-n and/or may communicate with one or more pluggable card within the optical nodes 14a-n. In some implementations, the computer system 26 may be a remote network element.

The communication network 30 may permit bi-directional communication of information and/or data between the computer system 26 and/or the optical nodes 14a-n. The communication network 30 may interface with the computer system 26 and/or the optical nodes 14a-n in a variety of ways. For example, in some implementations, the communication network 30 may interface by optical and/or electronic interfaces, and/or may use a plurality of network topographies and/or protocols including, but not limited to, Ethernet, TCP/IP, UDP, circuit switched path, combinations thereof, and/or the like. The communication network 30 may utilize a variety of network protocols to permit bi-directional interface and/or communication of data and/or information between the computer system 26 and/or the optical nodes 14a-n.

The communication network 30 may be almost any type of network. For example, in some implementations, the communication network 30 may be a version of an Internet network (e.g., exist in a TCP/IP-based, or UDP, network). In one implementation, the communication network 30 is the Internet. It should be noted, however, that the communication network 30 may be almost any type of network and may be implemented as the World Wide Web (or Internet), a local area network (LAN), a wide area network (WAN), a metropolitan network, a wireless network, a cellular network, a Bluetooth network, a Global System for Mobile Communications (GSM) network, a code division multiple access (CDMA) network, a 3G network, a 4G network, an LTE network, a 5G network, a satellite network, a radio network, an optical network, a cable network, a public switched telephone network, an Ethernet network, combinations thereof, and/or the like.

If the communication network 30 is the Internet, a primary user interface of the computer system 26 may be delivered through a series of web pages or private internal web pages of a company or corporation, which may be written in hypertext markup language, JavaScript, and/or the like, and accessible by the user. It should be noted that the primary user interface of the computer system 26 may be another type of interface including, but not limited to, a Windows-based application, a tablet-based application, a mobile web interface, a VR-based application, an application running on a mobile device, and/or the like. In one implementation, the communication network 30 may be connected to the user device (not shown), the computer system 26, and the optical nodes 14a-n.

The number of devices and/or networks illustrated in FIG. 1 is provided for explanatory purposes. In practice, there may be additional devices and/or networks, fewer devices and/or networks, different devices and/or networks, or differently arranged devices and/or networks than are shown in FIG. 1. Furthermore, two or more of the devices illustrated in FIG. 1 may be implemented within a single device, or a single device illustrated in FIG. 1 may be implemented as multiple, distributed devices. Additionally, or alternatively, one or more of the devices of the optical transport network 10 may perform one or more functions described as being performed by another one or more of the devices of the optical transport network 10. Devices of the computer system 26 may interconnect via wired connections, wireless connections, or a combination thereof. For example, in one implementation, the user device and the computer system 26 may be integrated into the same device; that is, the user device may perform functions and/or processes described as being performed by the computer system 26, described below in more detail.

Referring now to FIG. 2, shown therein is a diagrammatic view of an exemplary implementation of the computer system 26 of FIG. 1 constructed in accordance with the present disclosure. In some implementations, the computer system 26 may include, but is not limited to, implementations as a personal computer, a cellular telephone, a smart phone, a network-capable television set, a tablet, a laptop computer, a desktop computer, a network-capable handheld device, a server, a digital video recorder, a wearable network-capable device, a virtual reality/augmented reality device, and/or the like.

The computer system 26 may include one or more input device 34 (hereinafter the "input device 34"), one or more output device 38 (hereinafter the "output device 38"), one or more processor 42 (hereinafter the "processor 42"), one or more communication device 46 (hereinafter the "communication device 46") capable of interfacing with the communication network 30, one or more non-transitory processor-readable medium (hereinafter the "memory 50") storing processor-executable code and/or software application(s) 54 including, for example, a web browser capable of accessing a website and/or communicating information and/or data over a wireless or wired network (e.g., the communication network 30) and/or the like, and a data store 58. The input device 34, the output device 38, the processor 42, the communication device 46, and the memory 50 may be connected via a path 62 such as a data bus that permits communication among the components of the computer system 26.

The input device 34 may be capable of receiving information input from the user, another computer, and/or the processor 42, and transmitting such information to other components of the computer system 26 and/or the communication network 30. The input device 34 may include, but is not limited to, implementation as a keyboard, a touch-screen, a mouse, a trackball, a microphone, a camera, a fingerprint reader, an infrared port, a slide-out keyboard, a flip-out keyboard, a cell phone, a PDA, a remote control, a fax machine, a wearable communication device, a network interface, combinations thereof, and/or the like, for example.

The output device 38 may be capable of outputting information in a form perceivable by the user, another computer system, and/or the processor 42. For example, implementations of the output device 38 may include, but are not limited to, a computer monitor, a screen, a touch-screen, a speaker, a website, a television set, a smart phone, a PDA, a cell phone, a fax machine, a printer, a laptop computer, a haptic feedback generator, a network interface, combinations thereof, and the like, for example. It is to be understood that in some exemplary implementations, the input device 34 and the output device 38 may be implemented as a single device, such as, for example, a touch-screen of a computer, a tablet, or a smartphone. It is to be further understood that as used herein the term "user" is not limited to a human being, and may comprise a computer, a server, a website, a processor, a network interface, a user terminal, a virtual computer, combinations thereof, and/or the like, for example.

In some implementations, the processor 42 may comprise one or more processor 42 working together, or independently, to read and/or execute processor executable code and/or data, such as stored in the memory 50. The processor

42 may be capable of creating, manipulating, retrieving, altering, and/or storing data structures into the memory 50. Each element of the computer system 26 may be partially or completely network-based or cloud-based, and may or may not be located in a single physical location.

Exemplary implementations of the processor 42 may include, but are not limited to, a digital signal processor (DSP), a central processing unit (CPU), a field programmable gate array (FPGA), a microprocessor, a multi-core processor, an application specific integrated circuit (ASIC), combinations, thereof, and/or the like, for example. The processor 42 may be capable of communicating with the memory 50 via the path 62 (e.g., data bus). The processor 42 may be capable of communicating with the input device 34 and/or the output device 38.

The processor 42 may be further capable of interfacing and/or communicating with the optical nodes 14a-n via the communication network 30 using the communication device 46. For example, the processor 42 may be capable of communicating via the communication network 30 by exchanging signals (e.g., analog, digital, optical, and/or the like) via one or more ports (e.g., physical or virtual ports) using a network protocol (e.g., TCP/IP or UDP) to provide information to the optical transport network 10 (i.e., the optical nodes 14a-n) and receive information from the optical transport network 10 (i.e., the optical nodes 14a-n).

The memory 50 may store a software application 54 that, when executed by the processor 42, causes the computer system 26 to perform an action such as communicate with, or control, one or more component of the computer system 26, the optical transport network 10 (e.g., the optical nodes 14a-n), and/or the communication network 30.

In some implementations, the memory 50 may be located in the same physical location as the computer system 26, and/or one or more memory 50 may be located remotely from the computer system 26. For example, the memory 50 may be located remotely from the computer system 26 and communicate with the processor 42 via the communication network 30. Additionally, when more than one memory 50 is used, a first memory may be located in the same physical location as the processor 42, and additional memory may be located in a location physically remote from the processor 42. Additionally, the memory 50 may be implemented as a "cloud" non-transitory processor-readable storage memory (i.e., one or more of the memory 50 may be partially or completely based on or accessed using the communication network 30).

In some implementations, the data store 58 may be a time-series database, a relational database, a vector database, or a non-relational database. Examples of such databases include DB2®, Microsoft® Access, Microsoft® SQL Server, Oracle®, mySQL, PostgreSQL, MongoDB, Apache Cassandra, InfluxDB, Prometheus, Redis, Elasticsearch, TimescaleDB, and/or the like. It should be understood that these examples have been provided for the purposes of illustration only and should not be construed as limiting the presently disclosed inventive concepts. The data store 58 may be centralized or distributed across multiple systems.

Referring now to FIG. 3, shown therein is a diagrammatic view of an exemplary implementation of the optical node 14 constructed in accordance with the present disclosure. The optical node 14 may be an implementation of the first optical node 14a or the transponder node 16, for example. The optical node 14 may comprise at least one chassis 64, the at least one chassis 64 generally comprises a node controller 66 communicably coupled to one or more field replaceable unit 70a-n, such as one or more line module, one or more ROADM, one or more Tributary Interface Module (TIM), an optical power splitter, an optical protection switching module, and an optical power coupler/combiner.

In one implementation, each node controller 66 may include one or more processor 74 (hereinafter the "controller processor 74") and one or more controller memory 78 (hereinafter the "controller memory 78") storing processor-executable code and/or software application(s) such as such as a communication application 80 and a data store 82. The communication application 80 may provide for an inter-node communication infrastructure.

In some implementations, the controller processor 74 may comprise one or more processor working together, or independently, to read and/or execute processor-executable code and/or data, such as stored in the controller memory 78. The controller processor 74 may be capable of creating, manipulating, retrieving, altering, and/or storing data structures into the controller memory 78. Each element of the node controller 66 may be partially or completely network-based or cloud-based, and may or may not be located in a single physical location.

Exemplary implementations of the controller processor 74 may include, but are not limited to, a digital signal processor (DSP), a central processing unit (CPU), a field programmable gate array (FPGA), a microprocessor, a multi-core processor, an application specific integrated circuit (ASIC), combinations, thereof, and/or the like, for example.

The controller processor 74 may be further capable of interfacing and/or communicating with the field replaceable units 70a-n via a messaging intranet 86. For example, the controller processor 74 may be capable of communicating via the messaging intranet 86 by exchanging signals (e.g., analog, digital, optical, and/or the like) via one or more ports (e.g., physical or virtual ports) using a network protocol (e.g., TCP/IP or UDP) to provide information to the field replaceable units 70a-n and receive information from the field replaceable units 70a-n.

In some implementations, the controller memory 78 comprises a non-transitory processor-readable medium storing processor-executable instructions that when executed by the controller processor 74 cause the controller processor 74 to perform one or more action. The controller memory 78 may be located in the same physical location as the node controller 66, and/or one or more controller memory 78 may be located remotely from the node controller 66. For example, the controller memory 78 may be located remotely from the node controller 66 and communicate with the controller processor 74 via the communication network 30. Additionally, when more than one controller memory 78 is used, a first controller memory may be located in the same physical location as the controller processor 74, and additional controller memory may be located in a location physically remote from the controller processor 74. Additionally, the controller memory 78 may be implemented as a "cloud" non-transitory processor-readable storage memory (i.e., one or more of the controller memory 78 may be partially or completely based on or accessed using the communication network 30).

In some implementations, the data store 82 may be a time-series database, a relational database, a vector database, or a non-relational database. Examples of such databases include DB2©, Microsoft® Access, Microsoft® SQL Server, Oracle®, mySQL, PostgreSQL, MongoDB, Apache Cassandra, InfluxDB, Prometheus, Redis, Elasticsearch, TimescaleDB, Chroma, Pinecone, Weaviate, and/or the like. It should be understood that these examples have been provided for the purposes of illustration only and should not be construed as limiting the presently disclosed inventive concepts. The data store 82 may be centralized or distributed across multiple systems.

In one implementation, as shown in FIG. 3, the optical node 14 includes a first chassis 64a comprising a first node controller 66a having a first controller processor 74a and a first controller memory 78a and a second chassis 64b comprising a second node controller 66b having a second controller processor 74b and a second controller memory 78b. In this implementation, a particular node controller 66 may further operate as a shelf controller. For example, the first node controller 66a may operate as a primary node controller operable to control one or more operation of coupled node controllers 66, such as the second node controller 66b, which may operate as a shelf controller. Here, the first node controller 66a as the primary node controller may be communicably coupled to the second node controller 66b via a communication channel 96. The communication channel 96 may be constructed in accordance with the communication network 30 as herein described, and may comprise an NCT cable coupling the first node controller 66a with the second node controller 66b operating as the shelf controller. In one implementation, when two or more chasses 64 are coupled together, there may be one node controller 66 operating as the primary node controller, while each other node controller 66 may operate as shelf controllers.

The node controller 66 may be operable to monitor a connection status of the field replaceable units 70a-n (i.e., plugged in or plugged out) and a control plane state of the communication device. As described further below, the connection status and the control plane state may be provided to the node controller 66 by an embedded device of one or more of the field replaceable units 70a-n.

In one implementation, each of the field replaceable units 70a-n may further include one or more module processor 90 in communication with one or more module memory 94. The module processor 90 may be constructed in accordance with the controller processor 74 as described above in more detail, and in one implementation the module processor 90 may be shared with the controller processor 74. The module memory 94 may be a non-transitory processor-readable medium storing processor-executable instructions that when executed by the module processor 90 cause the module processor 90 to perform one or more action and/or function. The module memory 94 may be constructed in accordance with the controller memory 78 as detailed above. In one implementation, the module memory 94 may be a shared memory with the controller memory 78.

The number of devices illustrated in FIG. 3 is provided for explanatory purposes. In practice, there may be additional devices, fewer devices, different devices, or differently arranged devices than are shown in FIG. 3. Furthermore, two or more of the devices illustrated in FIG. 3 may be implemented within a single device, or a single device illustrated in FIG. 3 may be implemented as multiple, distributed devices. Additionally, one or more of the devices illustrated in FIG. 3 may perform one or more function described as being performed by another one or more of the devices illustrated in FIG. 3.

Figure 4:
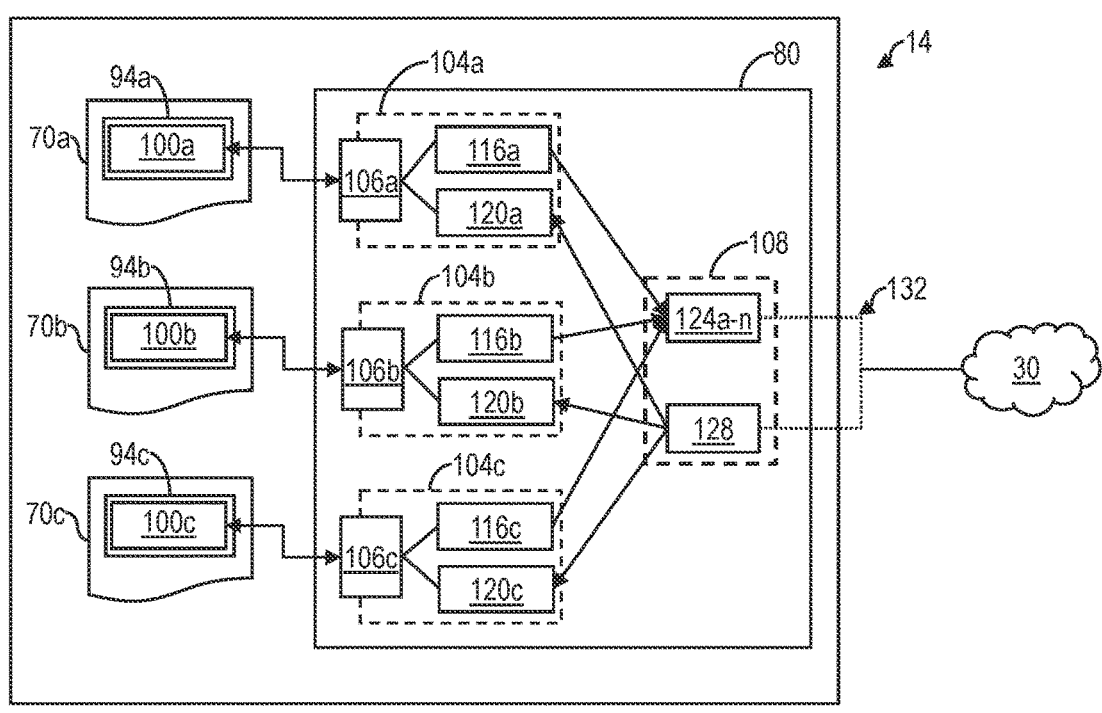
FIG. 4 is a functional view of an exemplary implementation of the optical node of FIG. 3 implementing a communication application and constructed in accordance with the present disclosure.

Referring now to FIG. 4, shown therein is a functional view of an exemplary implementation of the optical node 14 of FIG. 1 implementing the communication application 80 and constructed in accordance with the present disclosure. Generally, the controller processor 74 executing the communication application 80 stored in the controller memory 78 may provide an application-neutral application programmable interface (API) based communication infrastructure for one or more control plane application 100 (shown as control plane applications 100a-c) to collaborate across nodes. In this way, the API-based communication infrastructure enables control plane applications 100 on two different optical nodes 14 to accomplish control plane functions through invoking the API exposed by each respective optical node 14 (e.g., by the one or more control plane application 100 of each optical node 14). While the control plane application 100 is shown as being part of a field replaceable unit 70, in other implementations, the control plane application 100 may be stored on the controller memory 78 and may be executed by the controller processor 74.

In one implementation, each control plane application 100 may register with the communication application 80 thereby causing the controller processor 74 to generate an application plugin 104 associated with that control plane application 100. For example, as shown in FIG. 4, a first control plane application 100a is associated with a first application plugin 104a, a second control plane application 100b is associated with a second application plugin 104b, and a third control plane application 100c is associated with a third application plugin 104c.

In one implementation, when each control plane application 100 is registered with the communication application 80, the application plugin 104 associated with each control plane application 100 may further include an application interface 106 (e.g., an API as discussed below) and be associated with a messaging service 108. In one implementation, each application plugin 104 may comprise a messaging client plugin 116 and a messaging server plugin 120 and the messaging service 108 may comprise one or more messaging client 124a-n and a messaging server 128. In one implementation, the controller processor 74 executing the communication application 80 may instantiate the messaging service 108 having the messaging server 128 and the one or more messaging clients 124a-n and may instantiate a messaging network 132. In one implementation, the messaging network 132 may be implemented with bidirectional authentication and encryption, such as with TLS security. Moreover, in some implementations, certificates may be used for authentication. The certificates may be stored in the controller memory 78 and/or may be downloaded by the controller processor 74 to the controller memory 78. In one implementation, after sending a first request to the remote node, the messaging client 124 may (synchronously) wait for a first response from the remote node. Similarly, after receiving a second request from the remote node, the messaging server 128 may (synchronously) provide a second response to the remote node.

For example, as shown in FIG. 4, the first application plugin 104a may comprise a first messaging client plugin 116a associated with a first messaging client 124a and a first messaging server plugin 120a associated with the messaging server 128, the second application plugin 104b may comprise a second messaging client plugin 116b associated with a second messaging client 124b and a second messaging server plugin 120b associated with the messaging server 128, and the third application plugin 104c may comprise a third messaging client plugin 116c associated with a third messaging client 124c and a third messaging server plugin 120c associated with the messaging server 128. In this way, multiple control plane applications 100 may use the same infrastructure (e.g., the messaging service 108) instead of implementing a separate protocol for each function of the control plane application 100.

In one implementation, when the control plane application 100 is registered with the communication application 80, the control plane application 100 may also register one or more messaging server property of the messaging server plugin 120, such as API definitions, Protobuf definitions, and/or callback methods, with the messaging server 128. Similarly, each of the messaging client plugin 116 may provide (e.g., to the messaging clients 124a-n) one or more API for the control plane application 100 (associated with the messaging client plugin 116) and one or more detail of the remote node, such as one or more request property (detailed below), to invoke an API on the remote node via a messaging server on the remote node.

It should be understood that while the implementation shown in FIG. 4 includes three control plane applications 100 associated with three application plugins 104, more or fewer control plane applications 100 may be included on the optical node 14 with each control plane application 100 being associated with an application plugin 104.

In one implementation, each of the communication application 80; the control plane applications 100 that utilize the communication application 80; and one or more component of the communication application 80 may be deployed as separate microservices. In one implementation, each microservice may be a loosely coupled, self-contained processes operable to be executed independently (i.e., in separate containers, such as Docker containers or Kubernetes containers) by the controller processor 74. At least one of the microservices, e.g., a configuration manager 150 detailed below, may be operable to provide the non-real time processing of configuration and status handling, the non-real time reboot synchronization, and/or the like, for example. The microservices may serve as a hardware abstraction layer (HAL) providing an interface between the control plane application and hardware of the field replaceable units 70a-n.

In one implementation, the controller processor 74 may instantiate the messaging service 108 and the messaging network 132 may be implemented using well-defined protocols and may be implemented with a network protocol (e.g., TCP/IP stack or UDP stack) to communicate with, for example, remote nodes. For example, the messaging network 132 may be implemented as an inter-process communication (IPC) framework such as a remote procedure call (RPC) framework for inter-node communications (e.g., sending and/or receiving one or more communication with a remote node). The messaging service 108 may communicate with one or more remote node via the communication network 30. In one implementation, the RPC framework may be implemented with gRPC (Google LLC, Mountain View, California). The messaging network 132 having the RPC framework may utilize a serialization format for encoding and decoding data, such as Protobuf also developed by Google LLC. When the messaging service 108 is implemented with the RPC framework, the messaging server 128 may be an RPC messaging server and the messaging client 124 may be an RPC messaging client. As used herein, a remote node may be an optical node 14 or transponder node to or from which a communication/request/response is sent or received.

In one implementation, the data store 82 may store information (e.g., configuration information or other operational data) received from, for example, the one or more control plane applications 100. Further, in some implementations, the data store 82 may include one or more channel to which one or more messaging client 124 may publish information (e.g., state management information, configuration information, operational information, streaming information, and/or notification semantics) and to which one or more messaging server 128 may subscribe. In this way, the data store 82 may serve as an inter-process communication (IPC) framework for communication between the one or more messaging client 124 and the messaging server 128, which may be operating on a remote node.

Employing a microservice architecture as described herein allows for quicker and smaller sized updates, separation of service impacting and non-service impacting updates, independent and quick development and testing of the various components of the optical transport network 10 and control plane applications, and addition and expansion of features in live updates. It should be understood that these examples have been provided for the purposes of illustration only and should not be construed as limiting the presently disclosed inventive concepts.

Figure 5:
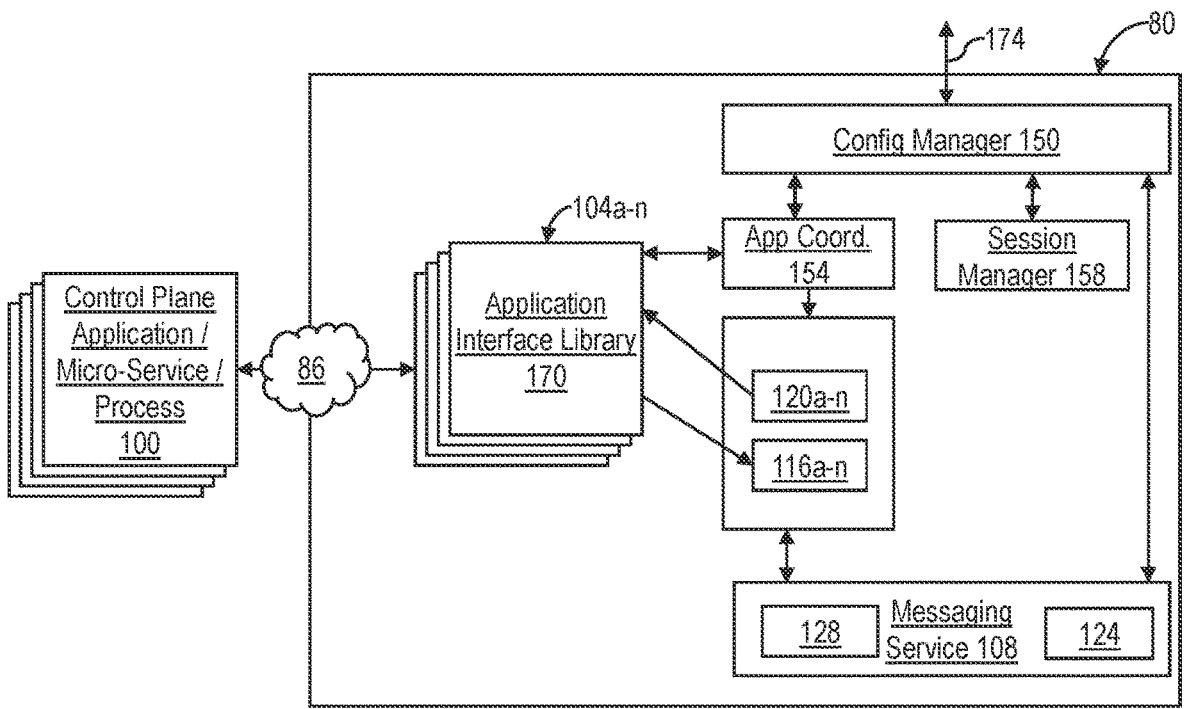
FIG. 5 is an architectural view of an exemplary implementation of the communication application of FIG. 4 constructed in accordance with the present disclosure.

Referring now to FIG. 5, shown therein is an architectural view of an exemplary implementation of the communication application 80 constructed in accordance with the present disclosure. The communication application 80 generally comprises one or more component such as a configuration manager 150, an application coordinator 154, a session manager 158, and the messaging service 108. Each component of the communication application 80 may be implemented as processor-executable instructions stored in the controller memory 78 that when executed by the controller processor 74 causes the controller processor 74 to perform one or more action in accordance with the function/component.

In one implementation, the configuration manager 150 generally handles configuration information coming from a management layer and relays the configuration information to components and updates state information reported by the components to the management layer via a configuration interface 174. In one implementation, the configuration manager 150 receives one or more state information from at least one of: the application coordinator 154 and the session manager 158, and transmits one or more configuration information to one or more of: the application coordinator 154 and the session manager 158.

In one implementation, the application coordinator 154 generally handles registration of each control plane application 100 with the communication application 80, e.g., receives a datastructure to implement the application interface 106, the messaging client plugin 116 and the messaging server plugin 120, and generates an association between each of the application interface 106, the messaging client plugin 116 and the messaging server plugin 120 with the messaging service 108. In one implementation, the application coordinator 154 further manages each of the control plane applications 100 as a containerized service, thereby isolating each control plane application 100 from each other. In one implementation, the application coordinator 154 may determine whether a particular control plane application 100 requires a dedicated session or a shared session when communicating with a particular remote server of the remote servers. For example, if two control plane applications 100, communicating with the particular remote server can utilize a shared session, the application coordinator 154 may provide that both control plane applications 100 communicate with the particular remote server in the same session.

In one implementation, the application coordinator 154, receives one or more command signal from the configuration manager 150 to register a particular control plane application 100. The controller processor 74 executing the application coordinator of the controller application 80, may access an application interface library 170 corresponding to the particular control plane application 100; extract one or more API set definition; and resolve function call bindings. The function call bindings may include, for example, resolving callback functions. In one implementation, resolving the function call bindings may be performed to connect the messaging server plugins 120 to the messaging server 128 and to connect the messaging client plugins 116 to one or more messaging client 124. In one implementation, each of the messaging server plugins 120 and the messaging client plugins 116 registered in the communication application 80 may be stored as either a static library or dynamic library in the application interface 170 and may be integrated into the communication application 80 as a separate library such that registration of a second control plane application 100 does not interfere with, and/or require regression of, the previously registered first control plane application 100.

In one implementation, the messaging service 108 generally represents the messaging server 128 and the one or more messaging clients 124a-n and abstracts the messaging server 128 and the one or more messaging clients 124a-n for the one or more other component in the communication application 80. In one implementation, when the messaging service 108 is enabled, the controller processor 74 executing the messaging service 108 instantiates the messaging server 128 and binds the messaging server 128 to a local IP address (e.g., an IP address of the optical node 14). In one implementation, the messaging server 128 may be multi-threaded, e.g., utilize more than one processing thread when executed by the controller processor 74; however, in other implementations, the messaging server 128 may be single-threaded.

In one implementation, when a neighbor optical node is configured or discovered (as described below), the controller processor 74 may instantiate a messaging client 124 operable to communicate, via the messaging network 132, with a remote node. In one implementation, the one or more messaging clients 124a-n may be a shared messaging client (e.g., more than one control plane application 100 may access and utilize the shared messaging client) or may be a dedicated/exclusive messaging client (e.g., the dedicated messaging client may only be accessed by a particular control plane application 100). In one implementation, when the controller processor 74, executing multiples of the control plane application 100 invokes an API corresponding to the shared messaging client to send a message towards the remote node, the messages from each of the multiples of the control plane application 100 may be serialized, and, at least in some implementations, may be prioritized, such as on thread priorities, when transmitted by the messaging client 124 to a messaging server 128 of the remote node.

In one implementation, the controller processor 74, executing the communication application 80, may implement a query API for a neighbor optical node to retrieve a list of API sets and versions supported on the optical node 14. The list of API sets may include, for example, APIs, from the application interface library 170, that are related to one another and the version of each API (e.g., an OpticalTx-PowerControl API set, a DigitalTrigger API set, and/or the like). In one implementation, each control plane application 100 may expose one or more API set in the application interface 106. Thus, when the controller processor 74 registers a particular control plane application 100 with the communication application 80, and registers the application interface 106 of the particular control plane application 100 with the application interface library 170, the list of API sets may include the exposed one or more API set of the control plane application 100.

In one implementation, the session manager 158 generally maintains a managed session (e.g., a keep-alive session) with the one or more remote node and may provide one or more status report of the managed session. The session manager 158 may be communicably coupled to the messaging service 108 such that the controller processor 74, executing the session manager 158, may send and/or receive one or more message via the messaging service 108. In one implementation, the controller processor 74 executing the session manager 158, may implement a managed session process and instantiates the managed session by exchanging a keep-alive (KA) message with a bidirectional streaming API call. Each optical node 14 may instantiate the managed session independently after accessing the query API for the neighbor optical node. As used herein, a bidirectional stream may include a client stream (e.g., a KA Request, or session request, having one or more request parameters) and a server stream (e.g., a KA Response, or session response, having one or more request parameters). In this way, the controller processor 74 may determine a status of the one or more remote node is "DOWN" based on an abnormal session termination.

In one implementation, the controller processor 74 executing the managed session process of the session manager 158 operable to instantiate the managed session with a remote node, may invoke a StartKASession API (via a messaging client 124) and pass the one or more request parameters of the session request. The optical node 14 may then receive the session response via the messaging client 124 from the messaging server of the remote node. In one implementation, the session request is transmitted via the messaging client 124 to the remote node at a regular interval, such as 30 seconds, or between about 15-45 seconds. In some implementations, the regular interval may be: a predetermined regular interval, a regular interval supplied by a user (e.g., via a user device or via the computer system 26), or may be a calculated regular interval based on a distance of the remote node from the optical node 14.

In one implementation, the controller processor 74 may monitor the StartKASession API to determine whether the StartKASession is active or terminated (e.g., closed). The controller processor 74, executing the session manager 158, may determine that communication with the remote node is "DOWN" when the StartKASession is terminated, for example, if the controller processor 74 has not received, via the messaging client 124, a session response form the remote node for a predetermined period of time. When the controller processor 74 determines that communication with the remote node is "DOWN" the controller processor 74 may try to reinvoke (e.g., invoke again) the StartKASession API with the session request, and may continue to do so while "DOWN" at a retry interval, such as, 120 seconds, or between about 90-150 seconds. In one implementation, the retry interval may change based on a number of retries such that, after a first number of retries, the retry interval is increased and after a second number of retries, the retry interval is increased again. In one implementation, the controller processor 74, executing the session manager 158, may determine that communication with the remote node is "UP" when the StartKASession is active (and, in some implementations, without an error). In this manner, the controller processor 74 may determine whether both the optical node 14 and the remote node are "UP" or "DOWN" at any point in time.

In one implementation, the one or more request parameters of the session request comprises one or more of: a sequence number, a StartKASession API version, the regular interval, a node name of the optical node 14, a nodeID of the optical node 14, a node type of the optical node 14, one or more node capabilities of the optical node 14 (such as in a capability bitmap), and a node epoch (e.g., a start time-stamp).

In one implementation, the one or more response parameters of the session response comprises one or more of: a sequence number (of the session request associated with the session response), a StartKASession API version (of the communication application 80 executing on the remote node), a response type (e.g., Acknowledge or Not-Acknowledge), a not-acknowledge reason, a node name of the remote node, a nodeID of the remote node, a node type of the remote node, one or more node capabilities of the remote node (such as in a capability bitmap), and a node epoch (e.g., a start timestamp). Each of the one or more response parameters may have a datatype such as: a signed/unsigned integer, an enum, a string, a HEX string, a HEX value, and/or the like, and may have one or more bitlength such as between 1-bit and 64-bit, for example, however, in some implementations, the bitlength may be longer.

In one implementation, the controller processor 74 may ensure that API versions are compatible. For example, the controller processor 74 may compart the StartKASession API version of the one or more request parameter with the StartKASession API version of the one or more response parameter.

In one implementation, the controller processor 74 may generate one or more mapping between a target IP address of the remote node and the node name and/or nodeID of the remote node, e.g., in a mapping stored in the controller memory 78 such as in a mapping table. Thus, when the control plane application 100 refers to a particular remote node by either the node name or the nodeID, the controller processor 74 may access the mapping to determine the target IP address of the referenced particular remote node. The controller processor 74, executing the messaging service 108, may then use the target IP address of the referenced particular remote node to identify one or more messaging client 124 having the target IP address.

In one implementation, the controller processor 74 executing the session manager 158 may store the session response and/or the one or more response parameters in the controller memory 78. By storing the session response and the one or more response parameters, the controller processor 74 may detect if the communication application 80 executing on the remote node has been restarted, for example, by comparing the node epoch response property of a second session response against the node epoch response property of a first session response (e.g., that was stored in the controller memory 78). By detecting that the communication application 80 of the remote node has restarted, the controller processor 74 may determine a communication status of the remote node.

In one implementation, the controller processor 74 executing the session manager 158 may transmit the communication status of the remote node to the configuration manager 150. The controller processor 74 may then cause the state of the remote node to be transmitted, e.g., via a configuration interface 174, and/or may update the communication status with one or more control plane application 100 registered to receive the communication status (as described below).

In one implementation, the controller processor 74 executing the communication application 80 may further instantiate a messaging intranet 86. The messaging intranet 86 may be implemented using well-defined protocols and may be implemented with a network protocol (e.g., TCP/IP stack or UDP stack) to communicate with, for example, control plane applications 100. For example, the messaging intranet 86 may be implemented with an inter-process communication (IPC) framework (i.e., an IPC messaging network) such as a remote procedure call (RPC) framework (i.e., as an RPC messaging network) and/or a specific IPC framework, each providing for and enabling intra-node communications (e.g., sending and/or receiving one or more application message to/from the one or more control plane application 100). The application interface 106 associated with each of the control plane applications 100 (and stored in the application interface library 170) may communicate with one or more remote node 14 via the messaging service 108 or with another control plane application 100 via the messaging intranet 86. In one implementation, the RPC framework may be implemented with gRPC (Google LLC, Mountain View, California). The messaging intranet 86 having the RPC framework may utilize a serialization format for encoding and/or decoding data, such as Protobuf also developed by Google LLC.

In one implementation, and as described in more detail below, the first control plane application 100a may send one or more first application message from the first control plane application 100a to the first application interface 106a using a first IPC framework while the second control plane application 100b may send one or more second application message from the second control plane application 100b to the second application interface 106b using a second IPC framework. In one implementation, the first IPC framework and the second IPC framework are implemented as the same IPC framework (e.g., both the first IPC framework and the second IPC framework are the RPC framework); while in other implementations, the first IPC framework and the second IPC framework are implemented as different IPC frameworks (e.g., the first IPC framework is implemented as the RPC framework and the second IPC framework is implemented as a specific IPC framework).

The number of devices/components illustrated in FIG. 5 is provided for explanatory purposes. In practice, there may be additional, fewer, different, or differently arranged devices/components than are shown in FIG. 5. Furthermore, two or more of the devices/components illustrated in FIG. 5 may be implemented within a single device/component, or a single device/component illustrated in FIG. 5 may be implemented as multiple, distributed devices/components. Additionally, one or more of the devices/components illustrated in FIG. 5 may perform one or more component described as being performed by another one or more of the devices/components illustrated in FIG. 5.

Figure 6:
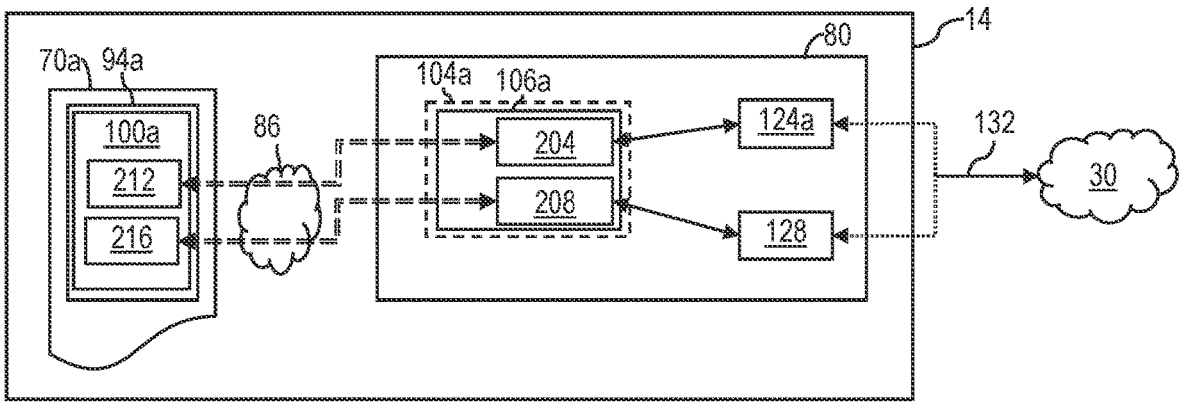
FIG. 6 is a diagrammatic view of an exemplary implementation of the optical node having the communication application implementing a messaging intranet constructed in accordance with the present disclosure.

Referring now to FIG. 6, shown therein is a diagrammatic view of an exemplary implementation of the optical node 14 having the communication application 80 implementing the messaging intranet 86 constructed in accordance with the present disclosure. In one implementation, each application interface 106 comprises an interface messaging server 204 and an interface messaging client 208 while each control plane application 100 further comprises an application messaging client 212 and an application messaging server 216. It should be noted that only one application interface 106 (the first application interface 106a) and one control plane application 100 (the first control plane application 100a) is shown for simplicity only, and, as described above in more detail, the communication application 80 may include more than one application interface 106 and more than one control plane application 100.

In one implementation, the data store 82 may store information (e.g., configuration information or other operational data) received from, for example, the one or more control plane applications 100. Further, in some implementations, for example if the communication application 80 and the control plane applications 100 are in the same process, the data store 82 may include one or more messaging server (e.g., the interface messaging server 204) to which the one or more control plane application 100 may send a request having one or more request property and information (e.g., state management information, configuration information, operational information, streaming information, and/or notification semantics) and one or more messaging client (e.g., the interface messaging client 208) from which the one or more control plane application 100 may send the request and receive a response. In this way, the data store 82 may serve as an inter-process communication (IPC) framework for communication between the control plane applications 100 and the application interfaces 106.

In one implementation, the messaging intranet 86 may be implemented as a remote procedure call (RPC) framework to enable communication (e.g., sending and/or receiving one or more message) between each control plane application 100 and the application interface 106. In one implementation, the messaging intranet 86 may be independent from the messaging network 132, that is, the messaging intranet 86 may have a different domain (i.e., IP/network domain) than the messaging network 132; however, in some implementations, IDL definitions can be used across domains (e.g., across network domains) to avoid copying parameters between the messaging intranet 86 and the messaging network 132.

In one implementation, the first control plane application 100a may invoke a particular API defined in the application interface library 170 by sending a request having one or more request parameter, such as a node name or nodeID, via the application messaging client 212 to the interface messaging server 204. The first application interface 106a having received the request via the interface messaging server 204 may in-turn invoke the API towards the remote node utilizing the associated messaging client 124 as determined by the messaging service 108 (e.g., via the mapping as described above). In one implementation, a response having the one or more response parameters may be received by the associated messaging client 124 and directed from the messaging service 108 to the interface messaging server 204 as based on the mappings as described above. The interface messaging server 204 may then provide the response having the one or more response parameters to the application messaging client 212 that originated the request.

In one implementation, the messaging server 128 of the messaging service 108 receives a request (e.g., an API call) from the remote node and invokes a callback function based on the one or more request property of the received request. The callback function may be registered to the application interface 106 in the application interface library 170. Thus, invoking the callback function may cause the application interface 106 (e.g., the first application interface 106a) to call the API defined in the first control plane application 100a by sending a message from the interface messaging client 208 to the application messaging server 216 via the messaging intranet 86. A response received by the application interface 106 from the application messaging server 216 of the first control plane application 100a may be sent back to the messaging server 128 of the messaging service 108, which, in turn, sends the response back to the remote node that sent the request, e.g., to a messaging client 124 of the remote node.

In one implementation, the messaging intranet 86 may be implemented as a specific IPC framework to enable communication (e.g., sending and/or receiving one or more message) between each control plane application 100 and the application interface 106. In one implementation, the messaging intranet 86 may be independent from the messaging network 132, that is, the messaging intranet 86 may have a different domain (i.e., IP/network domain) than the messaging network 132. Because the messaging intranet 86 and the messaging network 132 utilize differing frameworks, the controller processor 74 executing the application interface may convert messages passing between the messaging network 132 and the messaging intranet 86 (and, for example, IDL definitions) from a first encoding format associated with a first framework to a second encoding format associated with a second framework, e.g., from an encoding format associated with the specific IPC framework (e.g., an IPC encoding format) to the Protobuf encoding format of the RPC framework, and vice-versa. In one implementation, the controller processor 74 may store, e.g., in the controller memory 78, a mapping to map between the encoding associated with the specific IPC framework and the Protobuf encoding of the RPC framework.

In this implementation, the first control plane application 100a may send an operation and one or more request parameter from the application messaging client 212 (i.e., an IPC messaging client) to the interface messaging server 204 (i.e., an IPC messaging server) via the messaging intranet 86. The controller processor 74 executing the application interface 106 may then invoke an API associated with the operation, e.g., by invoking the API towards the remote node utilizing the associated messaging client 124 as determined by the messaging service 108 (e.g., via the mapping as described above and based on the operation and the one or more request parameter). In one implementation, a response having the one or more response parameters may be received by the associated messaging client 124 from the messaging server of the remote node and directed from the messaging service 108 to the associated interface messaging server 204 as based on the mappings as described above. The controller processor 74 executing the application interface 106 may then convert the response having the one or more response parameters from Protobuf encoding to the encoding associated with the specific IPC framework and transmit the converted response having the one or more response parameters from the interface messaging server 204 to the application messaging client 212 that originated the request via the messaging intranet 86.

In one implementation, the messaging server 128 of the messaging service 108 receives a request (e.g., an API call) from a messaging client of the remote node and invokes a callback function based on the one or more request property of the received request. The callback function may be registered to the first application interface 106a in the application interface library 170. The first application interface 106a may convert the request having the one or more request parameters from the Protobuf encoding to the encoding associated with the specific IPC framework. Thus, invoking the callback function may cause the application interface 106 (e.g., the first application interface 106a) to call the API defined in the first control plane application 100a by sending the converted request from the interface messaging client 208 to the application messaging server 216 via the messaging intranet 86. A response received by the interface messaging client 208 of the application interface 106 from the application messaging server 216 of the first control plane application 100a may be converted from the encoding associated with the specific IPC framework to the Protobuf encoding and the converted response may be sent back to the messaging server 128 of the messaging service 108, which, in turn, sends the response back to the messaging client of the remote node that sent the request.

The number of devices/components illustrated in FIG. 6 are provided for explanatory purposes. In practice, there may be additional, fewer, different, or differently arranged devices/components than are shown in FIG. 6. Furthermore, two or more of the devices/components illustrated in FIG. 6 may be implemented within a single device/component, or a single device/component illustrated in FIG. 6 may be implemented as multiple, distributed devices/components. Additionally, one or more of the devices/components illustrated in FIG. 6 may perform one or more function described as being performed by another one or more of the devices/components illustrated in FIG. 6.

From the above description, it is clear that the inventive concept(s) disclosed herein are well adapted to carry out the objects and to attain the advantages mentioned herein, as well as those inherent in the inventive concept(s) disclosed herein. While the embodiments/implementation of the inventive concept(s) disclosed herein have been described for purposes of this disclosure, it will be understood that numerous changes may be made and readily suggested to those skilled in the art which are accomplished within the scope and spirit of the inventive concept(s) disclosed herein.

What is claimed is:

1. An optical node, comprising:
a field replaceable unit comprising a module processor and a module memory comprising a non-transitory processor-readable medium storing processor-executable instructions and a control plane application that may be executed by the module processor; and
a node controller comprising a configuration interface, a controller processor, and a controller memory comprising a non-transitory processor-readable medium storing processor-executable instructions and a first communication application that when executed by the controller processor cause the controller processor to:
instantiate a first messaging network having a first messaging client and a first messaging server;
register an application plugin associated with the control plane application of the field replaceable unit with the first messaging network;
register an application interface comprising at least a callback function and operable to communicate with the control plane application of the field replaceable unit via a second messaging network;
receive, by the application interface via the second messaging network, a request having one or more request property from the module processor executing the control plane application;
transmit the request, via the application plugin, to the first messaging client;
receive a response via the first messaging client from a remote node, the response being associated with the request; and
transmit, by the application interface, the response to the module processor via the second messaging network.

2. The optical node of claim 1, wherein the request is a first request, and wherein the controller memory further stores processor-executable instruction that when executed by the controller processor, cause the controller processor to:

receive a second request from the first messaging server; and invoke the callback function registered by the application interface.

3. The optical node of claim 2, wherein the response is a first response, and wherein the controller memory further stores processor-executable instructions that when executed by the controller processor, cause the controller processor to:

receive, by the application interface via the second messaging network, a second response from the module processor executing the control plane application, the second response being associated with the second request; and transmit, by the first messaging server, the second response to the remote node.

4. The optical node of claim 1, wherein the first messaging network having the first messaging client and the first messaging server is an RPC messaging network having a first RPC messaging client and a first RPC messaging server.

5. The optical node of claim 1, wherein the second messaging network further comprises a second messaging client operable to transmit the response to the module processor and a second messaging server operable to receive the request from the module processor.

6. The optical node of claim 5, wherein the second messaging network is an RPC messaging network having a second RPC messaging client and a second RPC messaging server.

7. The optical node of claim 5, wherein the second messaging network is an IPC messaging network having an IPC messaging client and an IPC messaging server.

8. The optical node of claim 7, wherein the request further includes an operation and a parameter set.

9. The optical node of claim 1, wherein the controller memory further stores processor-executable instruction that when executed by the controller processor, cause the controller processor to:

convert, by the application interface, the response from a first encoding format associated with the first messaging network to a second encoding format associated with the second messaging network; and convert, by the application interface, the response from the second encoding format associated with the second messaging network to the first encoding format associated with the first messaging network.

10. The optical node of claim 9, wherein the second encoding format is one of: an IPC encoding format and a Protobuf encoding format.

11. The optical node of claim 9, wherein the first encoding format is a Protobuf encoding format.

12. The optical node of claim 1, wherein the first messaging network has a first network domain and the second messaging network has a second network domain.

13. The optical node of claim 12, wherein the first network domain is different from the second network domain.

14. The optical node of claim 1, wherein the controller memory further stores processor-executable instruction that when executed by the controller processor, cause the controller processor to:

establish a managed session between the controller processor and the remote node.

15. The optical node of claim 14, wherein establishing the managed session includes storing processor-executable instructions that when executed by the controller processor, cause the controller processor to:

transmit a session request to the remote node at a regular interval, the session request comprising one or more request parameter;

receive a session response from the remote node, the session response comprising one or more response parameter; and determine that the remote node has a communication status of active while receiving the session response.

16. The optical node of claim 15, wherein the session request is a first session request, and the controller memory further stores processor-executable instructions that when executed by the controller processor, cause the controller processor to:

upon not receiving the session response form the remote node after a predetermined period of time, transmit a second session request to the remote node at the regular interval after a retry interval.

17. The optical node of claim 16, wherein the retry interval is between 90 and 150 seconds.

18. The optical node of claim 15, wherein the regular interval is a period of time between 15 and 45 seconds.

19. The optical node of claim 15, wherein the one or more request parameter and the one or more response parameter includes one or more of: a sequence number, an API version, a node name, a nodeID, a node type, a capability bitmap, and a node epoch.

20. An optical transport network, comprising:

a source node, comprising:

a first field replaceable unit comprising a first module processor and a first module memory comprising a non-transitory processor-readable medium storing processor-executable instructions and a control plane application that may be executed by the first module processor;

a first node controller comprising a first controller processor and a first controller memory comprising a first non-transitory processor-readable medium storing processor-executable instructions and a first communication application that when executed by the first controller processor cause the first controller processor to:

instantiate a first messaging network having a first messaging client and a first messaging server;

register a first application plugin associated with the control plane application of the first field replaceable unit with the first messaging network;

register a first application interface comprising at least a callback function and operable to communicate with the control plane application of the first field replaceable unit via a second messaging network;

receive, by the first application interface via the second messaging network, a request from the first module processor executing the control plane application;

transmit the request, via the first application plugin, to the first messaging client;

receive a response via the first messaging client, the response being associated with the request; and transmit, by the first application interface, the response to the first module processor via the second messaging network; and a remote node, comprising:

a second node controller comprising a second controller processor and a second controller memory comprising a second non-transitory processor-readable medium storing processor-executable instructions and a second communication application that when executed by the second controller processor cause the second controller processor to:

instantiate a third messaging network having a third messaging client and a third messaging server;

receive the request from the first messaging client via the third messaging server;

generate the response to the request; and transmit the response to the first messaging client via the third messaging server.

* * * * *